United States Patent
Bursell

(10) Patent No.: US 12,537,850 B2
(45) Date of Patent: Jan. 27, 2026

(54) CONCEALED MONITOR COMMUNICATIONS FROM A TASK IN A TRUSTED EXECUTION ENVIRONMENT

(71) Applicant: Red Hat, Inc., Raleigh, NC (US)

(72) Inventor: Michael H. M. Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 345 days.

(21) Appl. No.: 17/682,191

(22) Filed: Feb. 28, 2022

(65) Prior Publication Data

US 2022/0182409 A1 Jun. 9, 2022

Related U.S. Application Data

(63) Continuation of application No. 16/246,946, filed on Jan. 14, 2019, now Pat. No. 11,297,100.

(51) Int. Cl.
*H04L 9/40* (2022.01)
*G06F 11/30* (2006.01)
*G06F 11/34* (2006.01)

(52) U.S. Cl.
CPC ...... *H04L 63/1466* (2013.01); *G06F 11/3006* (2013.01); *G06F 11/3065* (2013.01); *G06F 11/3495* (2013.01); *H04L 63/1425* (2013.01)

(58) Field of Classification Search
CPC . H04L 63/14; H04L 63/1408; H04L 63/1466; H04L 63/1425; G06F 21/60; G06F 21/32; G06F 21/30; G06F 21/03
See application file for complete search history.

(56) References Cited

U.S. PATENT DOCUMENTS

| | | | |
|---|---|---|---|
| 6,108,739 | A | 8/2000 | James et al. |
| 7,590,855 | B2 | 9/2009 | Irwin |
| 7,607,131 | B2 | 10/2009 | Oe et al. |
| 8,935,746 | B2 | 1/2015 | Vetillard |
| 9,197,656 | B2 | 11/2015 | Butler et al. |
| 10,027,717 | B2 | 7/2018 | Ben-Shalom et al. |
| 2008/0115205 | A1 | 5/2008 | Aaron |
| 2010/0235542 | A1 | 9/2010 | Visharam et al. |
| 2014/0283099 | A1 | 9/2014 | Smith et al. |
| 2015/0358301 | A1 | 12/2015 | Dalbehera et al. |

(Continued)

OTHER PUBLICATIONS

Notice of Allowability for U.S. Appl. No. 16/180,091, mailed Feb. 3, 2022, 4 pages.

(Continued)

*Primary Examiner* — Kevin Bechtel
*Assistant Examiner* — Sayeda Salma Nahar
(74) *Attorney, Agent, or Firm* — Dority & Manning, P.A.

(57) ABSTRACT

Concealed monitor communications from a task in a trusted execution environment (TEE) are disclosed. A first task executing in a first trusted execution environment (TEE) implemented on a processor device determines that a monitor communication is to be sent to a monitor task, the first task being configured to generate response messages in response to requests from requestor tasks, the response messages having a predetermined characteristic. The first task generates the monitor communication, the monitor communication having the predetermined characteristic and an encoded monitor communication report. The first task sends the monitor communication toward the monitor task.

14 Claims, 14 Drawing Sheets

(56) References Cited

U.S. PATENT DOCUMENTS

| | | | |
|---|---|---|---|
| 2016/0080419 A1* | 3/2016 | Schiappa | H04L 63/1441 726/1 |
| 2016/0094573 A1 | 3/2016 | Sood et al. | |
| 2016/0226913 A1* | 8/2016 | Sood | G06F 21/577 |
| 2016/0283411 A1 | 9/2016 | Sheller et al. | |
| 2016/0350534 A1 | 12/2016 | Poornachandran et al. | |
| 2017/0147819 A1* | 5/2017 | Vasilenko | G06F 21/577 |
| 2017/0185789 A1* | 6/2017 | Khosravi | H04L 9/3263 |
| 2017/0195735 A1* | 7/2017 | Kaliamoorthi | H04N 21/42203 |
| 2017/0250892 A1 | 8/2017 | Cooper et al. | |
| 2018/0139221 A1* | 5/2018 | Chen | H04L 63/1441 |
| 2020/0034528 A1 | 1/2020 | Yang et al. | |
| 2020/0143044 A1 | 5/2020 | Bursell | |
| 2020/0228568 A1 | 7/2020 | Bursell | |

OTHER PUBLICATIONS

Author Unknown, "Introduction to Trusted Execution Environments," globalplatform.org/wp-content/uploads/2018/05/Introduction-to-Trusted-Execution-Environment-15May2018.pdf, May 2018, GlobalPlatform, Inc., 9 pages.

Atamli-Reineh, Ahmad, et al., "A Framework for Application Partitioning using Trusted Execution Environments," Cuncurrency and Computation: Practice and Experience, 2010, John Wiley & Sons, Ltd., 23 pages.

Jang, Jinsoo, et al., "Private Zone: Providing a Private Execution Environment using ARM TrustZone," IEEE Transactions on Dependable and Secure Computing, 2016, IEEE, 14 pages.

Jang, Jinsoo, et al., "SeCReT: Secure Channel between Rich Execution Environment and Trusted Execution Environment," Network and Distributed System Security Symposium, Feb. 2015, San Diego, California, Internet Society, 15 pages.

Masti, Ramya, "Enabling Isolation on Modern Computing Platforms," Doctoral Thesis, 2015, ETH Library, 197 pages.

Ning, Zhenyu, et al., "Position Paper: Challenges Towards Securing Hardware-assisted Execution Environments," Proceedings of the Hardware and Architectural Support for Security and Privacy, Jun. 25, 2017, Toronto, Canada, ACM, 8 pages.

Norton, Seth, et al., "Designing a Secure, High-Performance Remote Attestation Protocol," Trusted Execution Development, Oct. 13, 2016, Mitre Corporation, 64 pages.

Sabt, M. et al., "Trusted Execution Environment: What It is, and What It is Not," 2015 IEEE Trustcom/BigDataSE/SPA, Aug. 20-22, 2015, Helsinki, Finland, IEEE, pp. 57-64.

Notice of Allowance for U.S. Appl. No. 16/246,946, mailed Nov. 29, 2021, 10 pages.

Non-Final Office Action for U.S. Appl. No. 16/180,091, mailed Dec. 15, 2020, 10 pages.

Applicant-Initiated Interview Summary for U.S. Appl. No. 16/180,091, mailed Mar. 16, 2021, 4 pages.

Final Office Action for U.S. Appl. No. 16/180,091, mailed Jun. 3, 2021, 14 pages.

Applicant-Initiated Interview Summary for U.S. Appl. No. 16/180,091, mailed Aug. 4, 2021, 4 pages.

Advisory Action and AFCP 2.0 Decision for U.S. Appl. No. 16/180,091, mailed Sep. 14, 2021, 5 pages.

Notice of Allowance for U.S. Appl. No. 16/180,091, mailed Oct. 12, 2021, 8 pages.

* cited by examiner

CONCEALED MONITOR COMMUNICATIONS FROM A TASK IN A TRUSTED EXECUTION ENVIRONMENT

RELATED APPLICATION

This application is a continuation of co-pending U.S. patent application Ser. No. 16/246,946, filed on Jan. 14, 2019, entitled "CONCEALED MONITOR COMMUNICATIONS FROM A TASK IN A TRUSTED EXECUTION ENVIRONMENT," which is hereby incorporated herein by reference in its entirety.

BACKGROUND

Processor manufacturers are increasingly interested in providing a trusted execution environment (TEE) that allows tasks executing in a TEE to be protected with respect to confidentiality. Examples of TEEs include Intel's SGX TEE and AMD's SeV TEE. Tasks executing in a TEE cannot be directly queried or monitored by a host operating system.

SUMMARY

The examples relate to concealed monitor communications from a task in a trusted execution environment (TEE). If a task in a TEE determines that an abnormal condition exists, such as, by way of non-limiting example, that the task is under a starvation attack, or that messages generated and sent by the task are being intercepted due to a man-in-the-middle attack, the task generates a monitor communication having an encoded message and sends the monitor communication to a monitor task.

In one example, a method is disclosed. The method includes determining, by a first task executing in a first trusted execution environment (TEE) implemented on a processor device, that a monitor communication is to be sent to a monitor task. The first task is configured to generate response messages in response to requests from requestor tasks, the response messages having a predetermined characteristic. The method further includes generating the monitor communication, the monitor communication having the predetermined characteristic and an encoded monitor communication report. The method further includes sending the monitor communication toward the monitor task.

In another example, a system is provided. The system includes a first computing device, a first memory, a first processor device, and a trusted execution environment (TEE). The first processor device is coupled to the first memory and the TEE and is to determine, via a first task executing in the TEE, that a monitor communication is to be sent to a monitor task, the first task being configured to generate response messages in response to requests from requestor tasks, the response messages having a predetermined characteristic. The first processor device is further to generate the monitor communication, the monitor communication having the predetermined characteristic and an encoded monitor communication report. The first processor device is further to send the monitor communication toward the monitor task.

In another example, a computer program product is provided. The computer program product is stored on a non-transitory computer-readable storage medium and includes instructions to cause a processor device to determine, by a first task executing in a trusted execution environment (TEE), that a monitor communication is to be sent to a monitor task, the first task being configured to generate response messages in response to requests from requestor tasks, the response messages having a predetermined characteristic. The instructions further cause the processor device to generate the monitor communication, the monitor communication having the predetermined characteristic and an encoded monitor communication report. The instructions further cause the processor device to send the monitor communication toward the monitor task.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
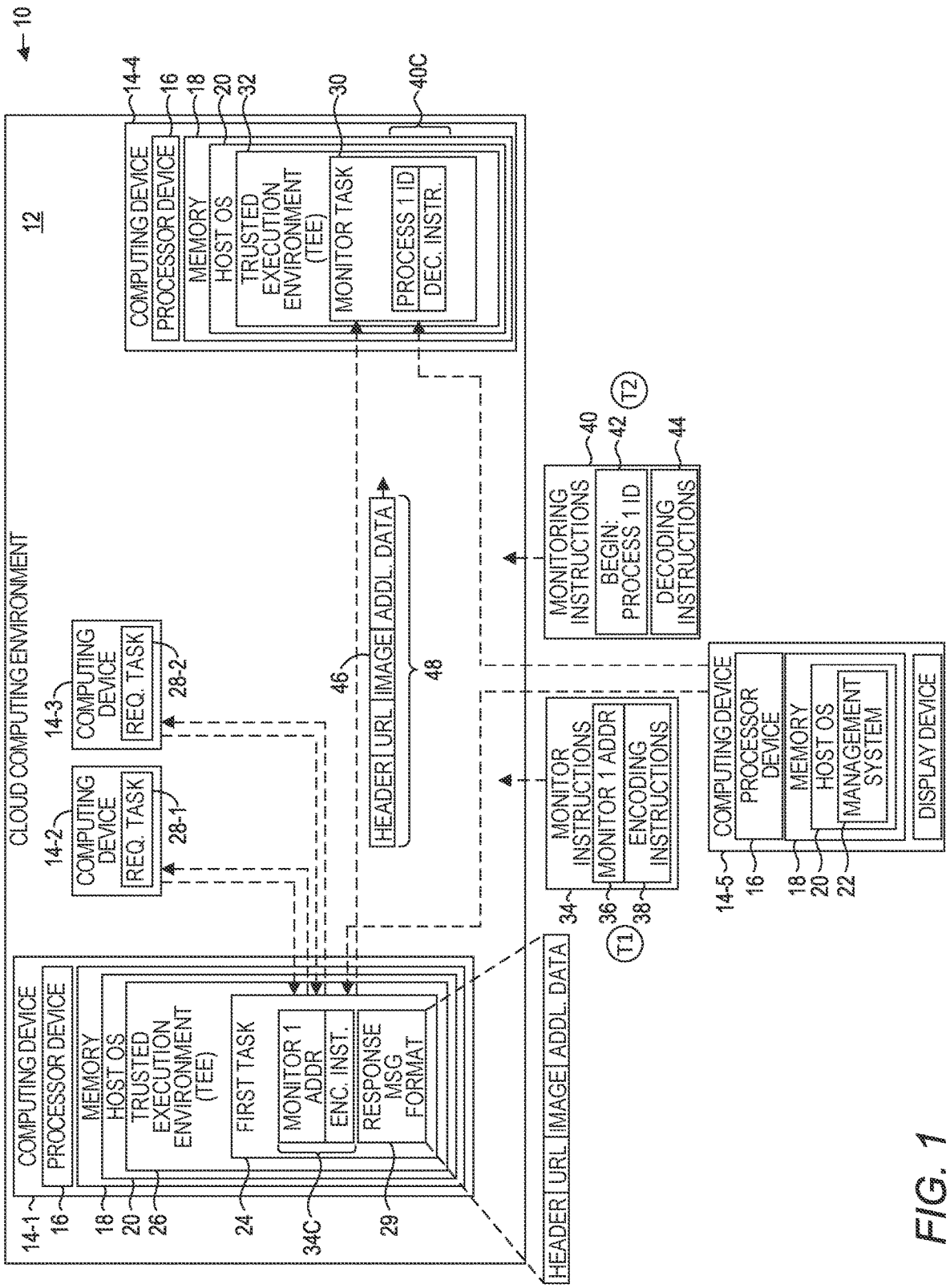
FIG. 1 is a block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize tasks of these concepts not particularly addressed herein. It should be understood that these concepts and tasks fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first task" and "second task," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Processor manufacturers are increasingly interested in providing trusted execution environments (TEEs) that allow tasks executing within the TEE to be protected with respect to confidentiality. Examples of TEEs include Inters SGX TEE and AMD's SeV TEE. Tasks executing in a TEE cannot, by design, be directly queried or monitored by a host operating system, and thus the host operating system is unable to determine whether a task in a TEE is executing properly or not, or is suffering from some abnormal condition due to a malicious task, such as an intercepting task. For example, the task may be under a resource starvation attack, or communications generated by the task may be compromised due to a man-in-the-middle attack. Moreover, in some situations, the host operating system itself may be the attacker.

As described in co-pending U.S. patent application Ser. No. 16/180,091, a task in a TEE may at times send monitor communications to a monitor task, and the monitor task, based on the monitor communications, may determine that the task in the TEE is under attack. The monitor task may then generate an alert, or perform some action based on this determination. However, in some instances, the task in the TEE cannot be confident that an intermediary malicious task, such as the host operating system or some other task, is not intercepting the monitor communications, such as may occur in a man-in-the-middle attack. In such situations, the malicious task may analyze communications generated by the task in the TEE, identify those communications that are monitor communications and glean information that may be considered proprietary or otherwise private, and may even be able to alter the content of the monitor communications, or inhibit such monitor communications from being sent to the monitor task.

The examples disclosed herein relate to concealed monitor communications from a task in a TEE. In particular, in response to requests for service from requestor tasks, a task in a TEE is configured to generate response messages that have a predetermined characteristic. For example, a predetermined characteristic may be that the response messages contain video segments, or contain audio segments, or have a predetermined format with defined fields that contain certain types of information. At some point in time, the task in the TEE determines that a monitor communication is to be sent to a monitor task. The determination may be made, by way of non-limiting example, based on a predetermined periodic interval at which the task in the TEE generates such monitor communications, or, based on a determination by the task in the TEE that an abnormal condition exists.

The task in the TEE encodes a monitor communication report to generate an encoded monitor communication report. The term "task" as used herein refers to an executing process or set of processes that provide some desired functionality. The task in the TEE generates the monitor communication to have the same predetermined characteristic as the response messages and to have the encoded monitor communication report. The task in the TEE sends the monitor communication toward the monitor task. To an intercepting malicious task, the monitor communication appears to be identical to a response message made in response to a request from a requestor task because the monitor communication has the same predetermined characteristic (or characteristics) as the response messages. Additionally, the intercepting malicious task is unable to detect that the monitor communication includes an encoded monitor communication report due to the encoded nature of the encoded monitor communication report, and is therefor unaware that the task has alerted the monitoring task to the existence of the malicious task.

The monitor task is configured to decode the encoded monitor communication report contained in the monitor communication. The encoded monitor communication report may comprise information that indicates that the task in the TEE has determined that an abnormal condition exists, and the monitor task may then take an appropriate action based on such determination.

FIG. 1 is a block diagram of an environment 10 in which examples disclosed herein may be practiced. In this example, the environment 10 includes a cloud computing environment 12. The phrase "cloud computing environment" refers to a computing environment, often provided by a third party, that facilitates dynamic and scalable computing resources as needed. Examples of cloud computing environments include Amazon AWS and Microsoft Azure. It should be noted that while for purposes of illustration the examples are disclosed in the context of a cloud computing environment, the examples disclosed herein are not limited to a cloud computing environment and have applicability to any environment in which a TEE is used. The phrase "trusted execution environment (TEE)" as used herein refers to a processor device-implemented environment that allows code and data within the environment (i.e., the TEE) to be protected with respect to confidentiality. As discussed above, examples of TEEs include Inters SGX TEE and AMD's SeV TEE.

The environment 10 includes six computing devices 14-1-14-5 (generally, computing devices 14). The computing devices 14-1-14-4 are in the cloud computing environment 12. In this example, the computing device 14-5 is outside of the cloud computing environment 12 and controls, in conjunction with the cloud computing environment 12, the initiation and termination of various tasks on the computing devices 14-1-14-4. The computing devices 14 may comprise any suitable type of computing device, and each includes a processor device 16 and a memory 18 (not illustrated for computing devices 14-2-14-3). The processor devices 16 of the computing devices 14-1 and 14-4 are capable of implementing a TEE. The computing devices 14 may be running any suitable host operating system (OS) 20, such as a Microsoft® Windows® host OS 20, Linux host OS 20 or the like (not illustrated for computing devices 14-2-14-3).

The computing device 14-5 includes a management system 22 that is responsible for causing the initiation of various tasks in the cloud computing environment 12. The management system 22 may cause the initiation of tasks in the cloud computing environment 12 in response to demand, or any other suitable criteria. In this example, the management system 22 causes the initiation of a first task 24 in a TEE 26 of the computing device 14-1. The term "first" in the phrase "first task 24" is used solely to more easily distinguish herein the first task 24 in the TEE 26 from other tasks in the environment 10, and does not imply any particular functionality, priority, or any other attribute of the first task 24.

It will be noted that because the management system 22 is a component of the computing device 14-5, functionality implemented by the management system 22 may be attributed to the computing device 14-5 generally. Moreover, in examples where the management system 22 comprises software instructions that program a processor device 16 to carry out functionality discussed herein, functionality implemented by the management system 22 may be attributed herein to the processor device 16.

The first task 24 is configured to generate response messages in response to requestor tasks, such as requestor tasks 28-1-28-2 (generally, requestor tasks 28) that execute on the computing devices 14-2-14-3, respectively. The first task 24 may provide any desired service to the requestor tasks 28, such as a service that obtains and returns information in response to a request from a requestor task 28, or that performs calculations on data in response to a request from a requestor task 28, or the like. The response messages generated by the first task 24 have one or more predetermined characteristics. The predetermined characteristics can take any form, such as each response message may have a same response message format 29, and/or each response message may include a certain type of content, such as an image and/or an audio segment.

The management system 22 causes the initiation of a monitor task 30 in a TEE 32 of the computing device 14-4. It should be noted that while the first task 24 and the monitor task 30 are illustrated as being located on separate computing devices 14, in other examples, the first task 24 and the monitor task 30 may be implemented on a same computing device 14. It will be noted that because the monitor task 30 is a component of the computing device 14-4, functionality implemented by the monitor task 30 may be attributed to the computing device 14-4 generally. Moreover, in examples where the monitor task 30 comprises software instructions that program a processor device 16 to carry out functionality discussed herein, functionality implemented by the monitor task 30 may be attributed herein to the processor device 16. It should be noted that while the first task 24 and the monitor task 30 are illustrated as being located on separate computing devices 14, in other examples, the first task 24 and the monitor task 30 may be implemented on a same computing device 14.

At a time T1, the management system 22 provides the first task 24 monitor instructions 34 that include an address 36 of the monitor task 30 and encoding instructions 38 that indicate to the first task 24 how to encode a monitor communication report to generate an encoded monitor communication report that the first task 24 may send to the monitor task 30. The terms "encode" and "encoding" as used herein refer to use of information that has a coded meaning that can be understood only by a recipient that contains the decoding instructions. A recipient of the information that does not contain the decoding instructions cannot interpret the coded meaning of the information, although the recipient of the information may interpret the coded information to be something other than the coded meaning. As an example, a set of two different images may be used by the first task 24 to indicate a status of the first task 24. The first task 24 may send a message that contains a football image to indicate that the status is normal. A recipient of the message that has the decoding instructions interprets the football image as meaning that the first task 24 has a normal status. A recipient of the message that does not have the decoding instructions interprets the football image as simply being a football image. The first task 24 may send a message that contains a baseball image to indicate that the status of the first task 24 is abnormal. A recipient of the message that has the decoding instructions interprets the baseball image as meaning that the first task 24 has an abnormal status. A recipient of the message that does not have the decoding instructions interprets the baseball image as simply being a baseball image. Other encoding mechanisms may utilize steganography technologies. The examples disclosed herein are not intended to be limited to any particular type of encoding mechanism, so long as it requires a recipient to have the decoding instructions to properly interpret the coded meaning. The encoding instructions 38 may include, in this example, the football image and the baseball image and instructions that indicate the football image is to be used to indicate a normal operating status and the baseball image is to be used to indicate an abnormal operating status.

The management system 22 may communicate the monitor instructions 34 to the first task 24 in any suitable manner. In some examples, the management system 22 communicates the monitor instructions 34 to the first task 24 via environment variables. The first task 24 saves the monitor instructions 34 as monitoring instructions 34C for subsequent use, as discussed in greater detail below. It will be noted that the management system 22 may communicate the monitor instructions 34 to the first task 24 at the time of the initiation of the first task 24, or may communicate the monitor instructions 34 to the first task 24 subsequent to the initiation of the first task 24. Moreover, in some implementations, the encoding instructions 38 may be obtained by the first task 24 in some other manner than from the management system 22. In some examples, the encoding instructions 38 may be hard-coded into the first task 24. In other examples, the first task 24 may access some predetermined configuration file, or uniform resource locator (URL), to obtain the encoding instructions 38.

At a time T2, the management system 22 sends monitoring instructions 40 to the monitor task 30. The monitoring instructions 40 include a task identifier 42 that identifies the first task 24 and decoding instructions 44 for decoding an encoded monitor communication report received from the first task 24. Using the example above, the decoding instructions 44 may indicate that the first task 24 will send a football image to indicate that the status of the first task 24 is normal, and will send a baseball image to indicate that the status of the first task 24 is abnormal. The monitor task 30 stores the monitoring instructions 40 as monitoring instructions 40C for subsequent use.

At some point in time, the first task 24 determines that a monitor communication is to be sent to the monitor task 30. The determination may be made, for example, in response to a timer that expires, which indicates it is time to send the monitor communication to the monitor task 30. In other examples, the determination may be made, for example, because the first task 24 has determined that an abnormal condition exists and desires to inform the monitor task 30 of the abnormal condition.

The first task 24 encodes a monitor communication report to generate an encoded monitor communication report 46. In this example, the first task 24 utilizes a football image to indicate a normal status to the monitor task 30. The first task 24 generates a monitor communication 48 to have the same predetermined characteristic, or characteristics, as do the response messages generated by the first task 24. By way of non-limiting example, the monitor communication 48 may have a same predetermined format with particular data fields at particular locations that contain certain types of information as the response messages. Or, the predetermined characteristic may be that each response message includes a certain type of data, such as image data, audio data, a uniform resource locator, or the like. The first task 24 includes the encoded monitor communication report 46 in the monitor communication 48. As an example, a predetermined characteristic of the monitor communication 48 may be that the monitor communication 48 includes an image in an image data field of the monitor communication 48. The first task 24 includes the encoded monitor communication report 46, which is an image of a football, in the image data field. The first task 24 sends the monitor communication 48 toward the monitor task 30. The term "toward" in this context means that the first task 24 addresses the monitor communication 48 to the monitor task 30, but the monitor communication 48 may be received by other devices prior to reaching the monitor task 30, such as intermediate switching and/or routing devices, or even by unintended malicious recipients who have taken the appropriate steps to intercept messages sent by the first task 24.

The monitor task 30 receives the monitor communication 48. The monitor task 30 decodes the encoded monitor communication report 46 to generate a decoded monitor communication report. In particular, the monitor task 30 accesses the decoding instructions 44 that correspond to the first task 24. The decoding instructions 44 indicate that the monitor communication 48 will contain an image, and if the image is of a football, then the first task 24 is operating normally, and if the image is of a baseball, then the first task 24 is operating abnormally. The monitor task 30 accesses the encoded monitor communication report 46 and determines that it is of a football, and based on the decoding instructions 44 determines that the decoded monitor communication report 46 indicates that the first task 24 is operating normally. Thus, in this example, the decoding is simply correlating a particular image with a particular status. In other examples however, such as when the encoding may involve steganography, the decoding may involve bit extraction and/or mathematical operations to generate the decoded monitor communication report.

Figure 2:
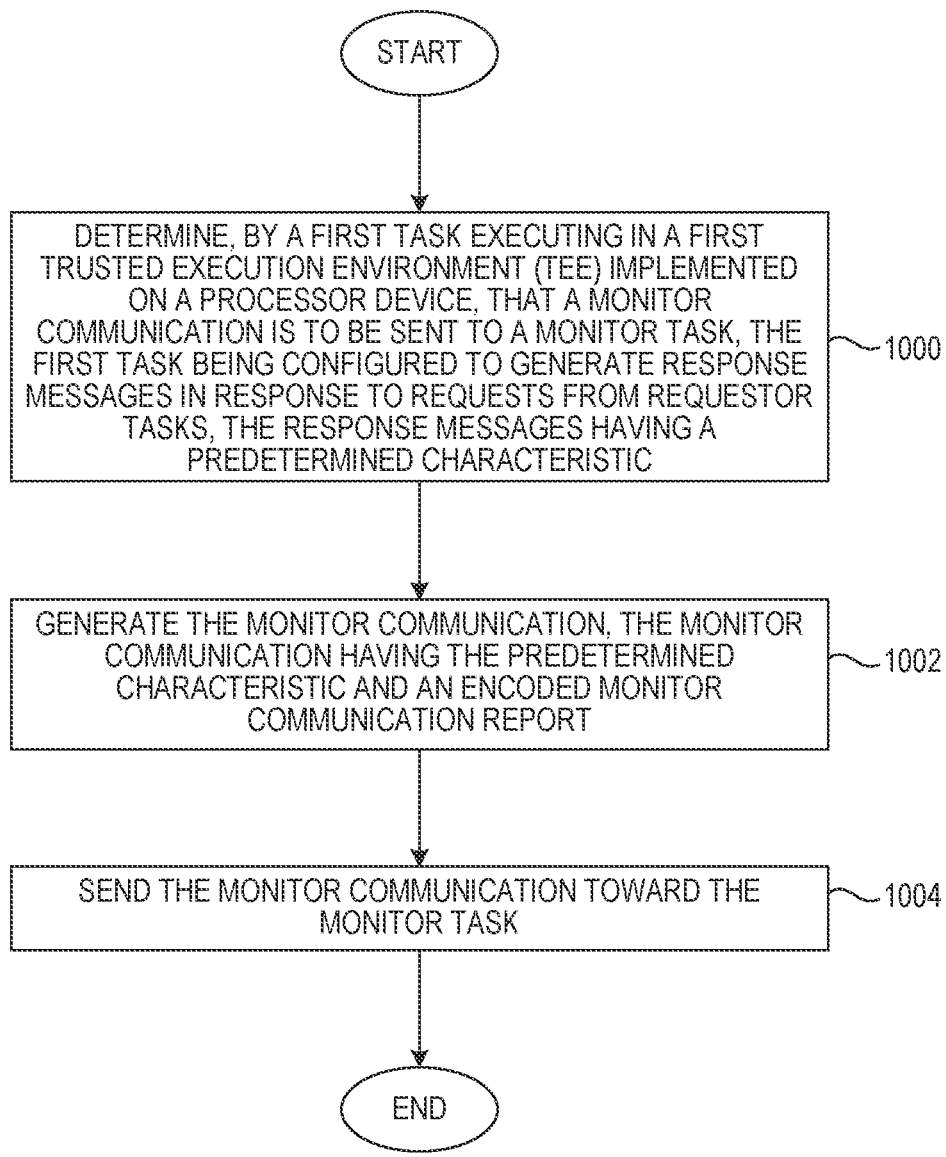
FIG. 2 is a flowchart of a method for concealed monitor communications from a task in a trusted execution environment (TEE) according to one example.

FIG. 2 is a flowchart of a method for concealed monitor communications from a task in a TEE according to one example. FIG. 2 will be discussed in conjunction with FIG. 1. The first task 24, executing in the TEE 26, determines that a monitor communication is to be sent to the monitor task 30. The first task 24 is configured to generate response messages in response to requests from requestor tasks 28, the response messages having a predetermined characteristic such as, in this example, the predetermined response message format 29 (FIG. 2, block 1000). The first task 24 determines that it currently has a normal operating status, and desires to send a monitor communication report that indicates a normal operating status to the monitor task 30. In particular, the first task 24 selects the football image to indicate that the first task 24 has a normal operating status. The first task 24 generates the monitor communication 48 to have the predetermined characteristic, in this example the response message format 29, and to include the encoded monitor communication report 46, in this example the football image (FIG. 2, block 1002). The first task 24 sends the monitor communication 48 toward the monitor task 30 (FIG. 2, block 1004).

Figure 3:
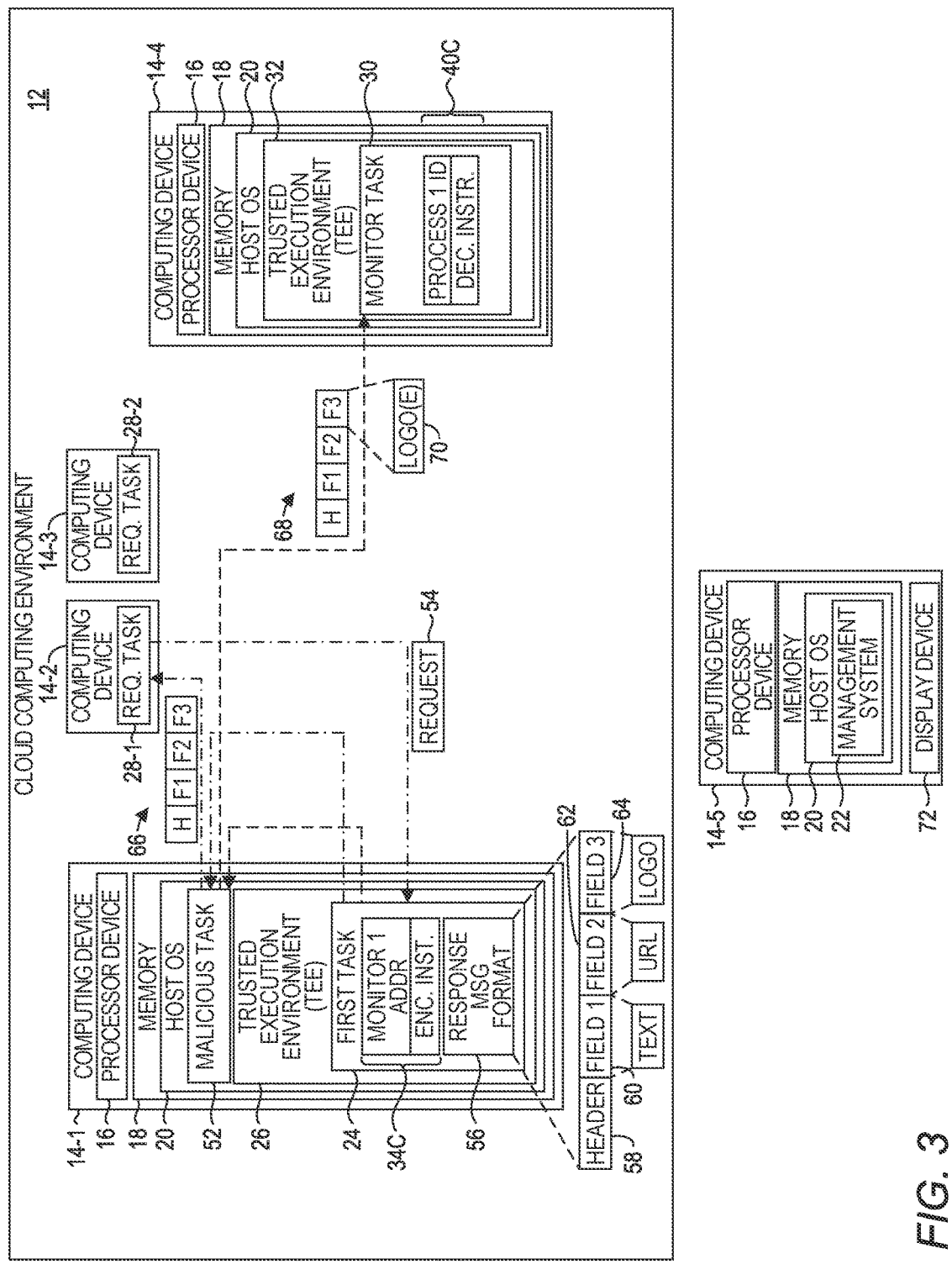
FIG. 3 is a block diagram of an environment suitable for concealed monitor communications from a task in a TEE according to another implementation.

FIG. 3 is a block diagram of an environment 10-1 according to another implementation. The environment 10-1 is identical to the environment 10, except as otherwise discussed herein. In this example, a malicious task 52 exists in the host OS 20 of the same computing device 14-1 as the TEE 26. The malicious task 52 intercepts each message generated by the first task 24, and may or may not forward the message to the intended recipient. As an example, the first task 24 receives a request 54 from the requestor task 28-1. In this example, the first task 24 generates response messages that have a predetermined characteristic of a particular response message format 56. The response message format 56 includes a header 58, a text field 60, a URL field 62, and a logo field 64. Thus, each response message generated by the first task 24 includes the header 58 and fields 60, 62 and 64, with appropriate data in the header 58 and in each of the fields 60, 62 and 64.

In response to the request 54, the first task 24 performs some action or actions, generates a response message 66 and sends the response message 66 toward the requestor task 28-1. However, the malicious task 52 intercepts the response message 66 and analyzes the response message 66. Over an initial period of time, the malicious task 52 analyzes a sufficient number of responses generated by the first task 24 to identify the response message format 56. Because the response message 66 complies with the response message format 56, the malicious task 52 concludes that the response message 66 is not an alert or indication from the first task 24 to a monitoring task that indicates that the first task 24 has determined that its response messages are being intercepted. After analyzing the response message 66 and gleaning the desired information, the malicious task 52 forwards the message to the requestor task 28-1.

At some point in time, the first task 24 determines, or suspects, the existence of the malicious task 21. In the case of an intercepting task such determination may be made, by way of non-limiting example, based on message latency measurements by the first task 24, or in a situation where an intercepting task modifies messages, by detecting that a message sent by the first task 24 does not exactly match the message received by a requestor task 28 that coordinates with the first task 24 and periodically requests responses for just this purpose. In the case of a resource starvation attack, such determination may be made, by way of non-limiting example, based on detecting clock drift or delays in sending/receiving network or storage traffic.

In response to this determination, the first task 24 determines that a monitor communication should be sent to the monitor task 30 that contains an encoded monitor communication report that indicates that the first task 24 is operating under an abnormal condition so that the monitor task 30 can take some predetermined action. In this example, the encoding instructions indicate that the first task 24 may utilize a first logo to indicate that the first task 24 believes that a task is intercepting response messages from the first task 24, a second logo to indicate that the first task 24 believes that the first task 24 is being denied resources necessary for execution of the first task 24 due to a resource starvation attack, a third logo to indicate any other abnormal condition, and a fourth logo to indicate that the first task 24 is operating under normal conditions. The first task 24 generates a monitor communication 68 that has the same response message format 56 as that of the response message 66. The first task 24 stores, in the logo field 64 of the monitor communication

68, an encoded monitor communication report in the form of a first logo 70 to indicate to the monitor task 30 that the first task 24 believes that a task is intercepting response messages from the first task 24. The first task 24 then sends the monitor communication 68 toward the monitor task 30.

The malicious task 52 intercepts the monitor communication 68 and analyzes the monitor communication 68. Because the monitor communication 68 complies with the response message format 56, the malicious task 21 concludes that the monitor communication 68 is not an alert or indication from the first task 24 to a monitoring task that indicates that the first task 24 has determined that its response messages are being intercepted. After analyzing the monitor communication 68 and gleaning any desired information, the malicious task 21 forwards the message to the monitor task 30.

The monitor task 30 receives the monitor communication 68 and decodes the encoded monitor communication report. The monitor task 30 determines that the first task 24 believes that messages from the first task 24 are being intercepted by a malicious task. The monitor task 30 may then take any desired action, such as generating and sending a message to the management system 22 that identifies the first task 24 and indicates that messages generated by the first task 24 are being intercepted by a malicious task. The management system 22 may, for example, present such information on a display device 72, and/or terminate the first task 24 and restart a copy of the first task 24 on a different computing device 14.

Figure 4:
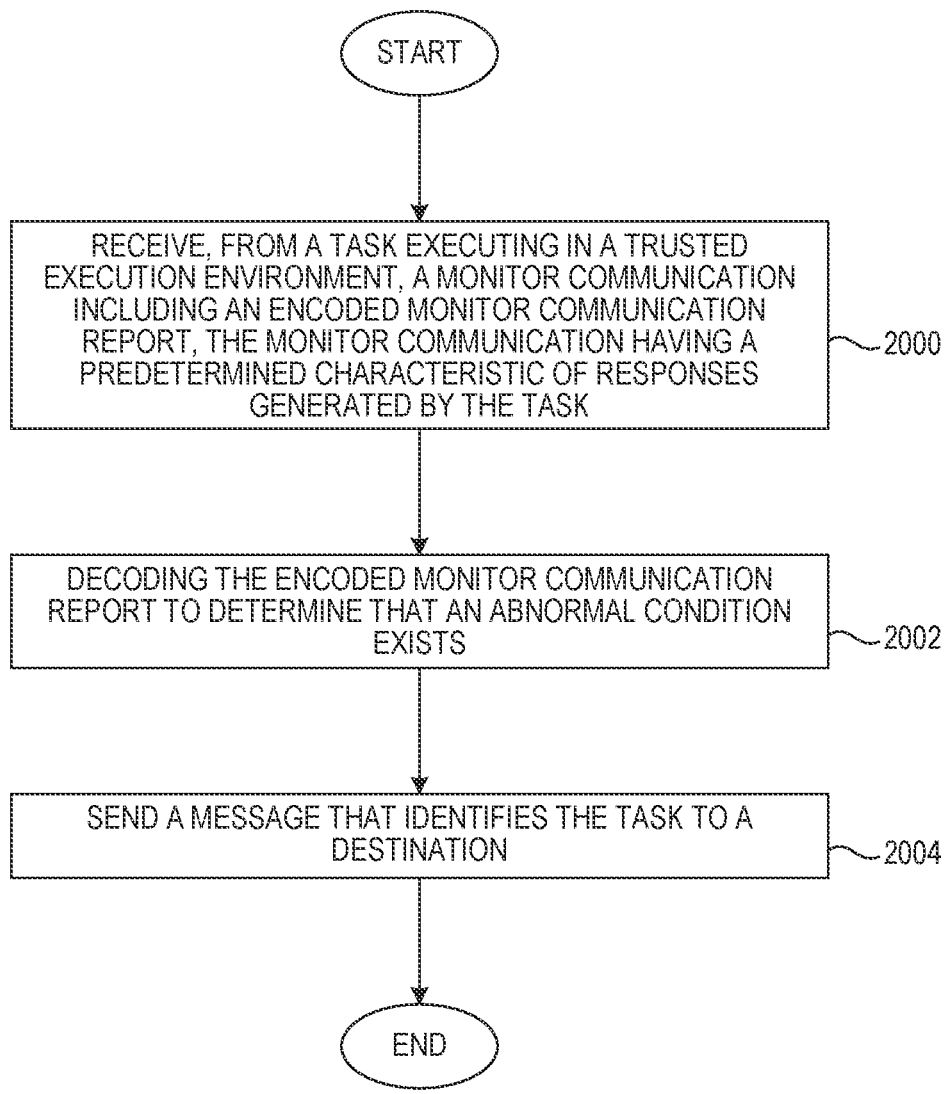
FIG. 4 is a flowchart of a method for decoding an encoded monitor communication report block contained in a monitor communication according to one example.

FIG. 4 is a flowchart of a method for decoding an encoded monitor communication report block contained in a monitor communication according to one example. FIG. 4 will be discussed in conjunction with FIG. 3. The monitor task 30 receives, from the first task 24 executing in the TEE 26, the monitor communication 68 that includes the encoded monitor communication report in the form of the first logo 70. The monitor communication 68 has a predetermined characteristic of responses generated by the first task 24. In this example, the predetermined characteristic is that the monitor communication 68 has the response message format 56 (FIG. 4, block 2000). The monitor task 30 decodes the encoded monitor communication report in the form of the first logo 70 to determine that an abnormal condition exists (FIG. 4, block 2002). In this example, based on the decoding instructions 44, the monitor task 30 determines that the first task 24 believes that messages generated by the first task 24 are being intercepted by a malicious task. The monitor task 30 sends a message that identifies the first task 24 to a destination (FIG. 4, block 2004). By way of non-limiting example, the destination may be a display device, and/or the management system 22.

Figure 5:
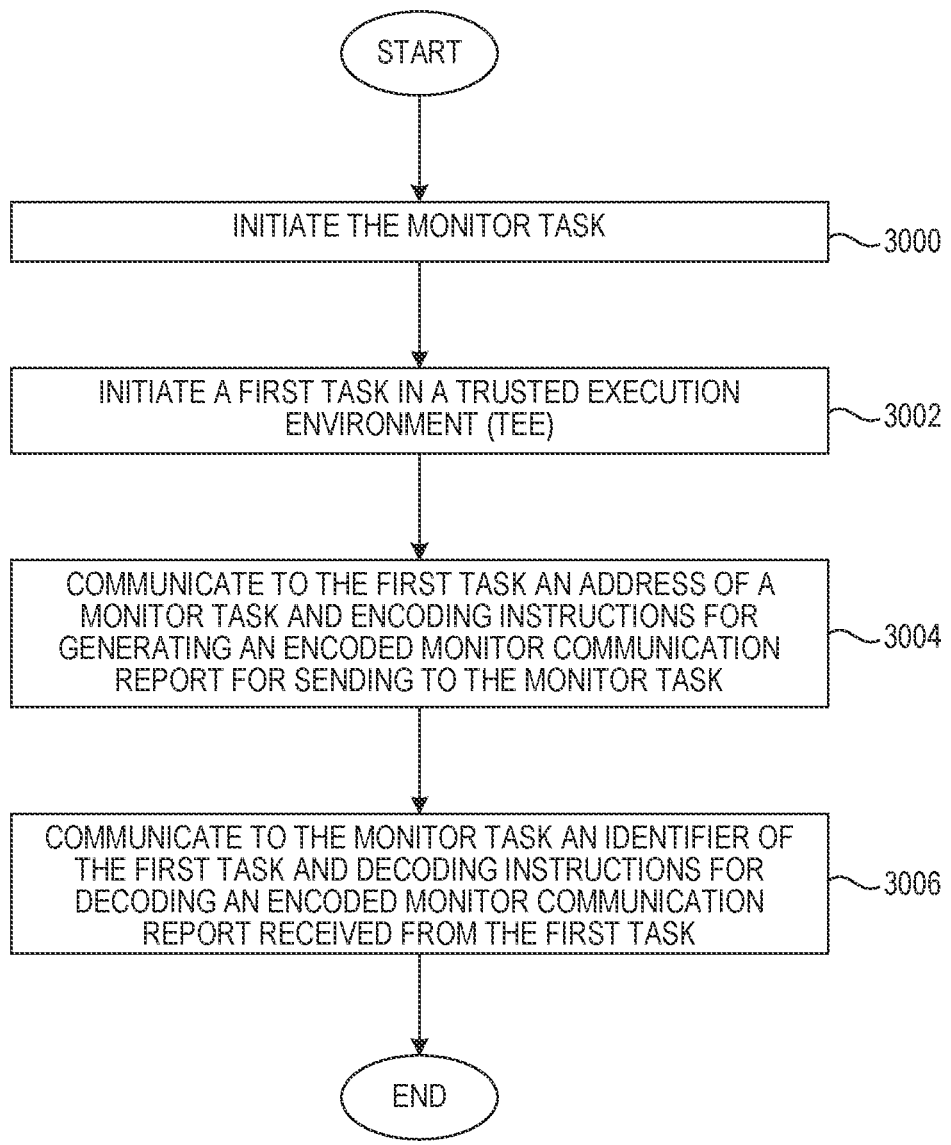
FIG. 5 is a flowchart of a method for initiating a task in a TEE with encoding instructions according to one example.

FIG. 5 is a flowchart of a method for initiating a task in a TEE with encoding instructions according to one example. FIG. 5 will be discussed in conjunction with FIG. 1. The management system 22 initiates the monitor task 30 in the TEE 32 (FIG. 5, block 3000). The management system 22 initiates the first task 24 in the TEE 26 (FIG. 5, block 3002). The management system 22 communicates to the first task 24 the address 36 of the monitor task 30 and encoding instructions 38 for generating the encoded monitor communication report 46 for sending to the monitor task 30 (FIG. 5, block 3004). The management system 22 communicates to the monitor task 30 the task identifier 42 of the first task 24 and the decoding instructions 44 for decoding the encoded monitor communication report 46 received from the first task 24 (FIG. 5, block 3006).

Figure 6:
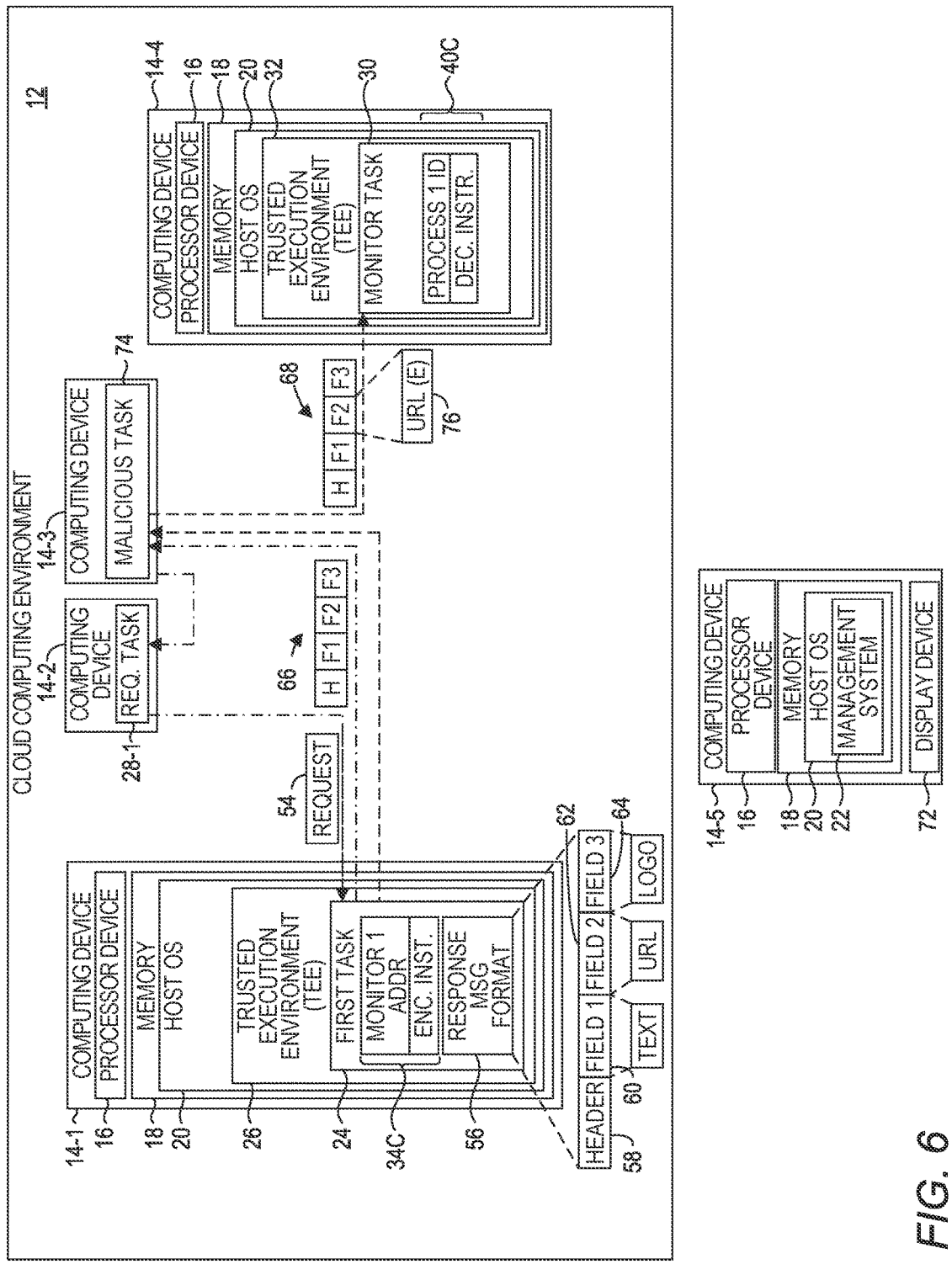
FIG. 6 is a block diagram of an environment suitable for concealed monitor communications from a task in a TEE according to another implementation.

FIG. 6 is a block diagram of an environment 10-2 suitable for concealed monitor communications from a task in a trusted execution environment according to another implementation. This example is substantially similar to the environment 10-1 discussed above with regard to FIG. 3 except as otherwise discussed herein. In this example, a malicious task 74 has initiated on the computing device 14-3 rather than the computing device 14-1 that hosts the first task 24. The malicious task 74 has performed actions to intercept message responses sent by the first task 24. Similar to the environment 10-2, the first task 24 receives a request 54 from the requestor task 28-1. The first task 24 generates response messages that have the predetermined characteristic of the particular response message format 56. The response message format 56 includes the header 58, the text field 60, the URL field 62 and the logo field 64. Thus, each response message generated by the first task 24 includes the header 58 and fields 60, 62 and 64, with appropriate data in the header 58 and in each of the fields 60, 62 and 64.

In response to the request 54, the first task 24 performs some action or actions, generates a response message 66 and sends the response message 66 toward the requestor task 28-1. However, the malicious task 74 intercepts the response message 66 and analyzes the response message 66. Because the response message 66 complies with the response message format 56, the malicious task 74 concludes that the response message 66 is not an alert or indication from the first task 24 to a monitor task that indicates that the first task 24 has determined that its response messages are being intercepted. After analyzing the response message 66 and gleaning the desired information, the malicious task 74 forwards the message to the requestor task 28-1. Note that while for purposes of illustration the malicious task 74 is illustrated as being inserted in between the first task 24 and recipients of response messages from the first task 24, such as the requestor tasks 28 and the monitor task 30, in other examples, the malicious task 74 may simply "snoop" and obtain a copy of each response message relatively concurrently with the delivery of such response messages to the intended recipient. In such examples the malicious task 74 need not forward the response message to the recipient because the recipient also receives a copy of the response message.

At some point in time, the first task 24 determines, or suspects, the existence of the malicious task 74. In response to this determination, the first task 24 determines that a monitor communication should be sent to the monitor task 30 that contains an encoded monitor communication report that indicates that the first task 24 is operating under an abnormal condition so that the monitor task 30 can take some predetermined action. In this example, the encoding instructions indicate that the first task 24 may utilize a first URL that refers to a document that indicates that the first task 24 believes that a task is intercepting response messages from the first task 24, a second URL that refers to a document that indicates that the first task 24 believes that the first task 24 is being denied resources in a resource starvation attack, a third URL that refers to a document that indicates any other abnormal condition, and a fourth URL that refers to a document that indicates that the first task 24 is operating under normal conditions. The first task 24 generates a monitor communication 68 that has the same response message format 56 as that of the response message 66. The first task 24 stores, in the URL field 62 of the monitor communication 68, an encoded monitor communication report in the form of a first URL 76 to indicate to the monitor task 30 that the first task 24 believes that a task is intercepting response messages from the first task 24. The first task 24 then sends the monitor communication 68 toward the monitor task 30.

The malicious task 74 intercepts the monitor communication 68 and analyzes the monitor communication 68. Because the monitor communication 68 complies with the response message format 56, the malicious task 74 concludes that the monitor communication 68 is not an alert or indication from the first task 24 to a monitoring task that indicates that the first task 24 has determined that its response messages are being intercepted. After analyzing the monitor communication 68 and gleaning any desired information, the malicious task 74 forwards the message to the monitor task 30.

The monitor task 30 receives the monitor communication 68 and decodes the encoded monitor communication report. The monitor task 30 accesses the first URL 76, accesses the document to which the first URL 76 refers, and based on such document determines that the first task 24 believes that messages from the first task 24 are being intercepted by a malicious task. The monitor task 30 may then take any desired action, such as generating and sending a message to the management system 22 that identifies the first task 24 and indicates that messages generated by the first task 24 are being intercepted by a malicious task. The management system 22 may, for example, present such information on the display device 72, and/or terminate the first task 24 and restart a copy of the first task 24 on a different computing device 14.

Figure 7A:
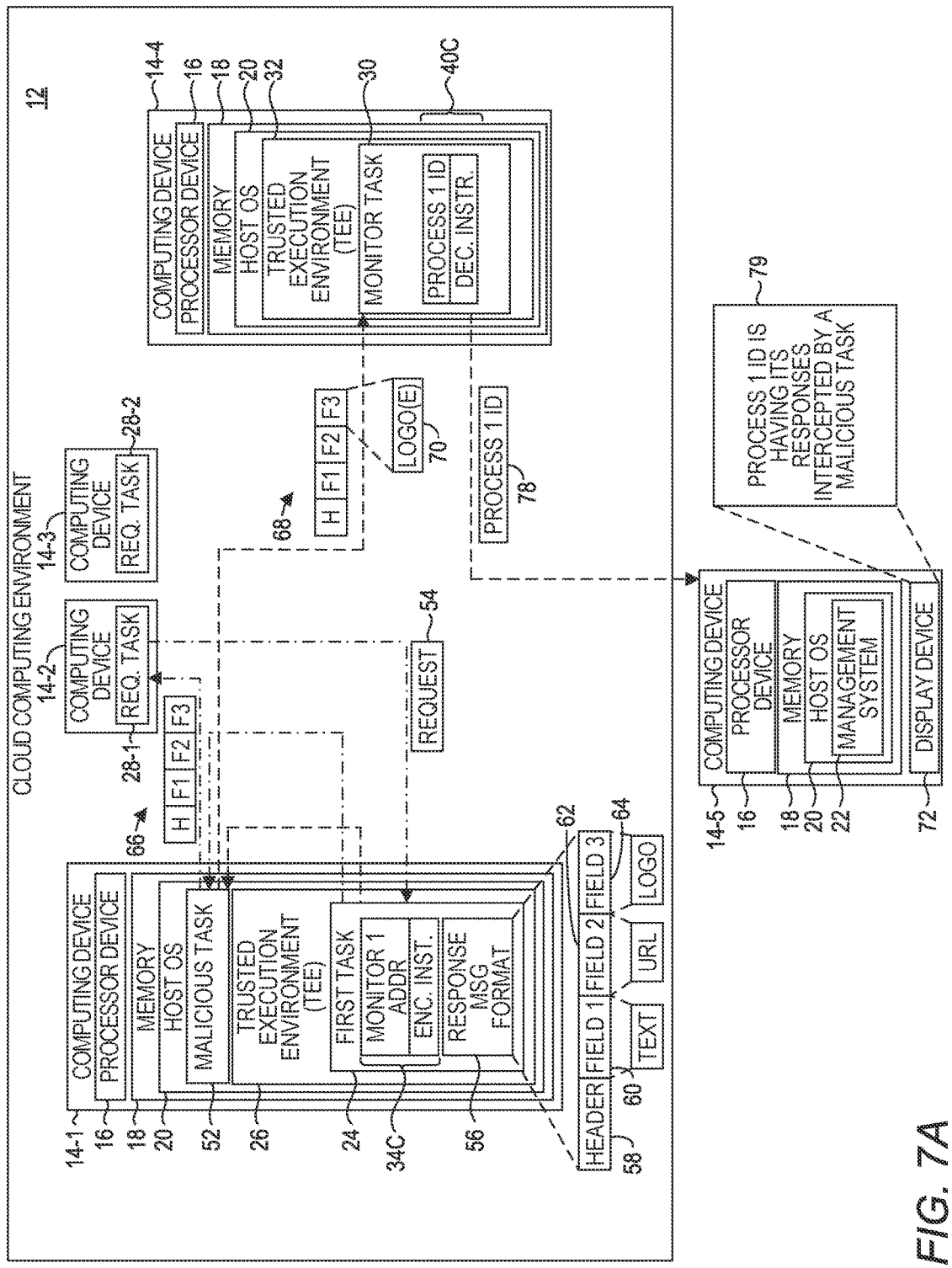
FIGS. 7A-7B illustrate the environment illustrated in FIG. 3 at points in time after a monitor task has received a monitor communication with an encoded monitor communication report that indicates that a first task believes that a task is intercepting response messages from the first task according to one example.
Figure 7B:
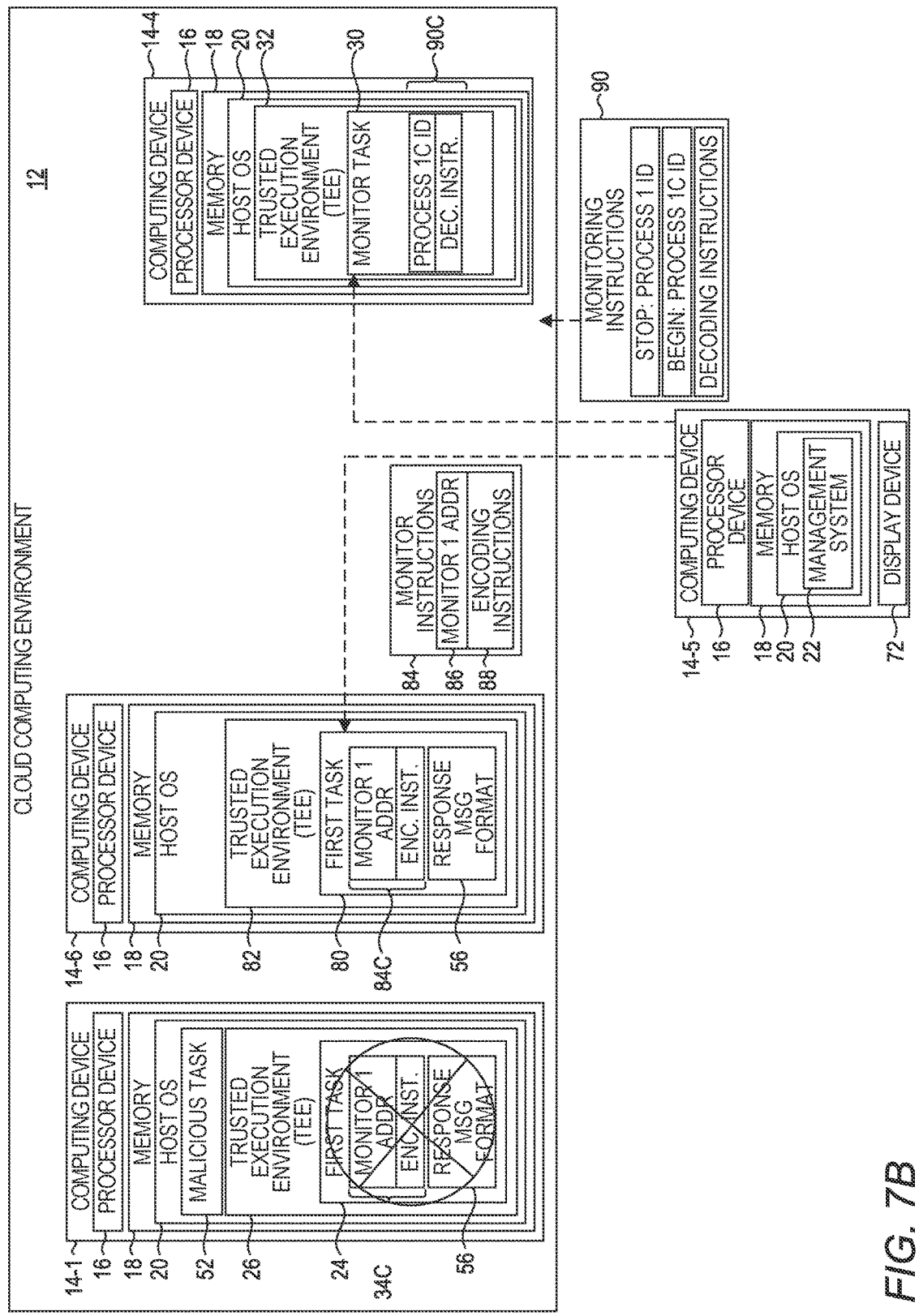

FIGS. 7A-7B illustrate the environment 10-1 illustrated in FIG. 3 at points in time after the monitor task 30 has received the monitor communication 68 with the encoded monitor communication that indicates that the first task 24 believes that a task is intercepting response messages from the first task 24 according to one example. Referring first to FIG. 7A, and as discussed above with regard to FIG. 3, the monitor task 30 receives the monitor communication 68 and decodes the encoded monitor communication report. The monitor task 30 determines that the first task 24 believes that messages from the first task 24 are being intercepted by a malicious task. The monitor task 30 may then generate and send a message 78 to the management system 22 that identifies the first task 24 and indicates that messages generated by the first task 24 are being intercepted by a malicious task. The management system 22 receives the message 78 and presents on the display device 72 a message 79 to an operator that indicates that the first task 24 is having its responses intercepted by a malicious task.

Referring now to FIG. 7B, note that FIG. 7B omits certain components illustrated in FIG. 7A solely for purposes of space. The management system 22 automatically terminates the first task 24. The management system 22 initiates a first task 80 that is a copy of the first task 24 in a TEE 82 of a computing device 14-6. The TEE 82, as the third TEE explicitly illustrated in FIG. 7B, may also be referred to as the "third TEE." The management system 22 sends the first task 80 monitor instructions 84 that include an address 86 of the monitor task 30 and encoding instructions 88 that indicates to the first task 24 how to encode a monitor communication report to generate an encoded monitor communication report that the first task 80 may send to the monitor task 30. The first task 80 saves the monitor instructions 84 as monitor instructions 84C. The first task 80 generates response messages that have a predetermined characteristic that comprises the particular response message format 56.

The management system 22 sends to the monitor task 30 monitoring instructions 90 that include instructions to no longer monitor the first task 24 and to begin monitoring the first task 80. The monitoring instructions 90 also include a task identifier that identifies the first task 80 and decoding instructions for decoding an encoded monitor communication report received from the first task 80. The monitor task 30 copies the monitoring instructions 90 as monitoring instructions 90C for subsequent use.

Figure 8:
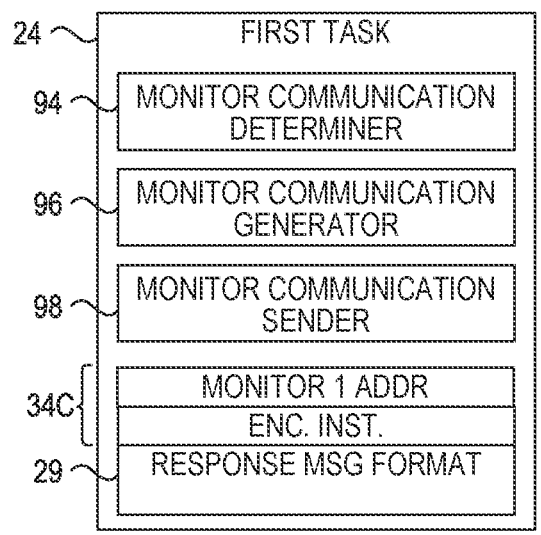
FIG. 8 is a block diagram of a first task that executes in a TEE according to some implementations.

FIG. 8 is a block diagram of the first task 24 according to some implementations. The first task 24 includes a monitor communication determiner 94 that is configured to determine that a monitor communication is to be sent to a monitor task as described herein. The monitor communication determiner 94 may comprise executable software instructions configured to program a processor device to implement the functionality of determining that a monitor communication is to be sent to a monitor task, may comprise circuitry including, by way of non-limiting example, an application-specific integrated circuit (ASIC), field-programmable gate array (FPGA), or may comprise a combination of executable software instructions and circuitry.

The first task 24 also includes a monitor communication generator 96 that is configured to generate a monitor communication that has a predetermined characteristic of response messages that are generated in response to requests from requestor tasks, and that has an encoded monitor communication report, as described herein. The monitor communication generator 96 may comprise executable software instructions configured to program a processor device to implement the functionality of determining that a monitor communication is to be sent to a monitor task, may comprise circuitry including, by way of non-limiting example, an ASIC, FPGA, or may comprise a combination of executable software instructions and circuitry.

The first task 24 also includes a monitor communication sender 98 that is configured to send the monitor communication toward the monitor task, as described herein. The monitor communication sender 98 may comprise executable software instructions configured to program a processor device to implement the functionality of determining that a monitor communication is to be sent to a monitor task, may comprise circuitry including, by way of non-limiting example, an ASIC, FPGA, or may comprise a combination of executable software instructions and circuitry.

Figure 9:
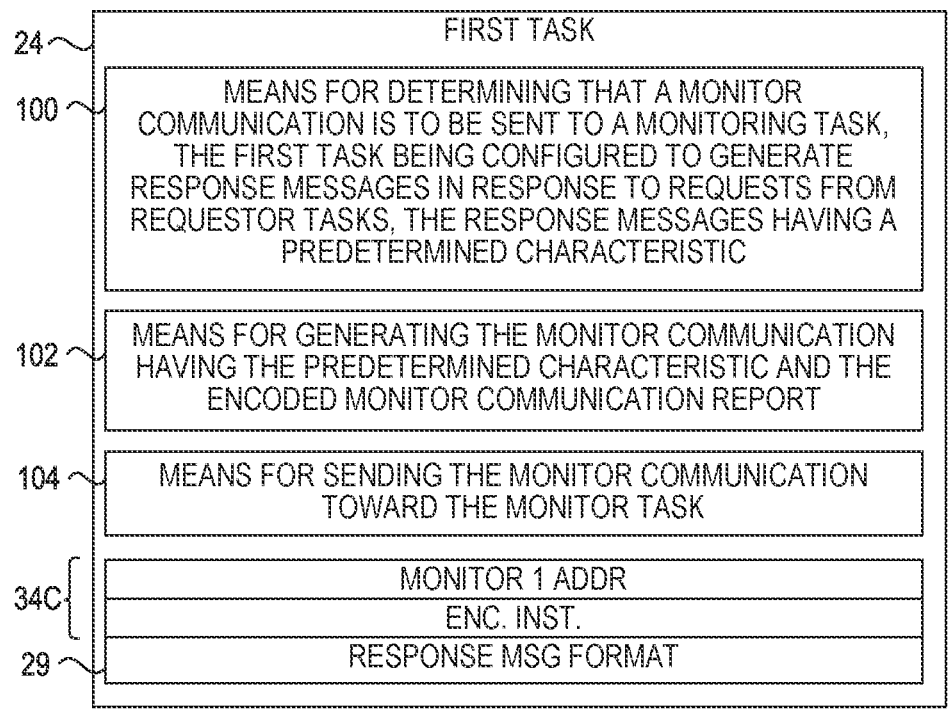
FIG. 9 is a block diagram of a first task that executes in a TEE according to additional implementations.

FIG. 9 is a block diagram of the first task 24 according to additional implementations. In this implementation, the first task 24 includes a means 100 for determining that a monitor communication is to be sent to a monitoring task. The means 100 may be implemented in any number of manners, including, for example, via the monitor communication determiner 94 illustrated in FIG. 8. The means 100 may implement logic to determine that a periodic timer has expired, and thus that it is time to send a monitor communication to a monitoring task. The means 100 may also implement logic that determines that an abnormal condition exists, such as a condition wherein response messages sent by the first task 24 are being intercepted by an intermediary task, or that the first task 24 is the subject of a starvation attack, and based on determining that the abnormal condition exists, determine that a monitor communication is to be sent to a monitoring task.

The first task 24 also includes a means 102 for generating a monitor communication that has a predetermined characteristic of response messages that are generated in response to requests from requestor tasks, and that has an encoded monitor communication report. The means 102 may be implemented in any number of manners, including, for example, via the monitor communication generator 96 illustrated in FIG. 8. The means 100 may implement logic that accesses information that identifies a predetermined characteristic of response messages that are generated in response to requests from requestor tasks and to generate a monitor communication that has such characteristics. The means 100 may implement logic for accessing encoding instructions that identify how to encode a monitor communication report in the monitor communication, and logic of encoding the monitor communication report in the monitor communication.

The first task 24 also includes a means 104 for sending the monitor communication toward the monitor task. The means 104 may be implemented in any number of manner, including, for example, via the monitor communication sender 98 illustrated in FIG. 8. The means 104 may implement logic that addresses a monitor communication to the monitor task, and transmits the monitor communication via an inter-process communication mechanism, such as via a physical or virtual network transceiver, or the like.

Figure 10:
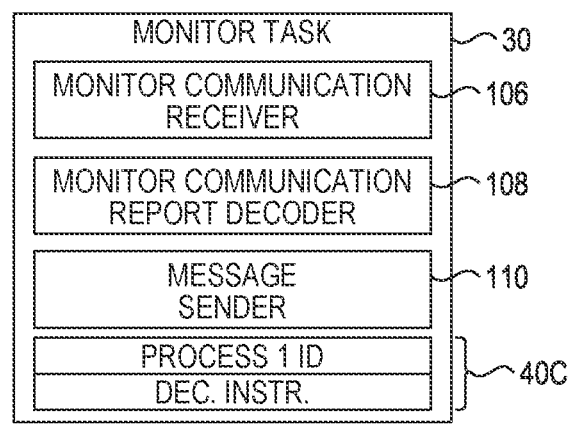
FIG. 10 is a block diagram of a monitor task suitable for monitoring a task that executes in a TEE according to some implementations.

FIG. 10 is a block diagram of the monitor task 30 according to some implementations. The monitor task 30 includes a monitor communication receiver 106 that is configured to receive a monitor communication having an encoded monitor communication report from a task, wherein the monitor communication has a predetermined characteristic of responses generated by the task. The monitor communication receiver 106 may comprise executable software instructions configured to program a processor device to implement the functionality of determining that a monitor communication is to be sent to a monitor task, may comprise circuitry including, by way of non-limiting example, an application-specific integrated circuit (ASIC), field-programmable gate array (FPGA), or may comprise a combination of executable software instructions and circuitry.

The monitor task 30 also includes a monitor communication report decoder 108 that is configured to decode the encoded monitor communication report that is in the monitor communication. The monitor communication report decoder 108 may comprise executable software instructions configured to program a processor device to implement the functionality of determining that a monitor communication is to be sent to a monitor task, may comprise circuitry including, by way of non-limiting example, an ASIC, FPGA, or may comprise a combination of executable software instructions and circuitry.

The monitor task 30 also includes a message sender 110 that is configured to send a message that identifies the task to a destination, such as the management system 22, and/or a display device. The message sender 110 may comprise executable software instructions configured to program a processor device to implement the functionality of determining that a monitor communication is to be sent to a monitor task, may comprise circuitry including, by way of non-limiting example, an ASIC, FPGA, or may comprise a combination of executable software instructions and circuitry.

Figure 11:
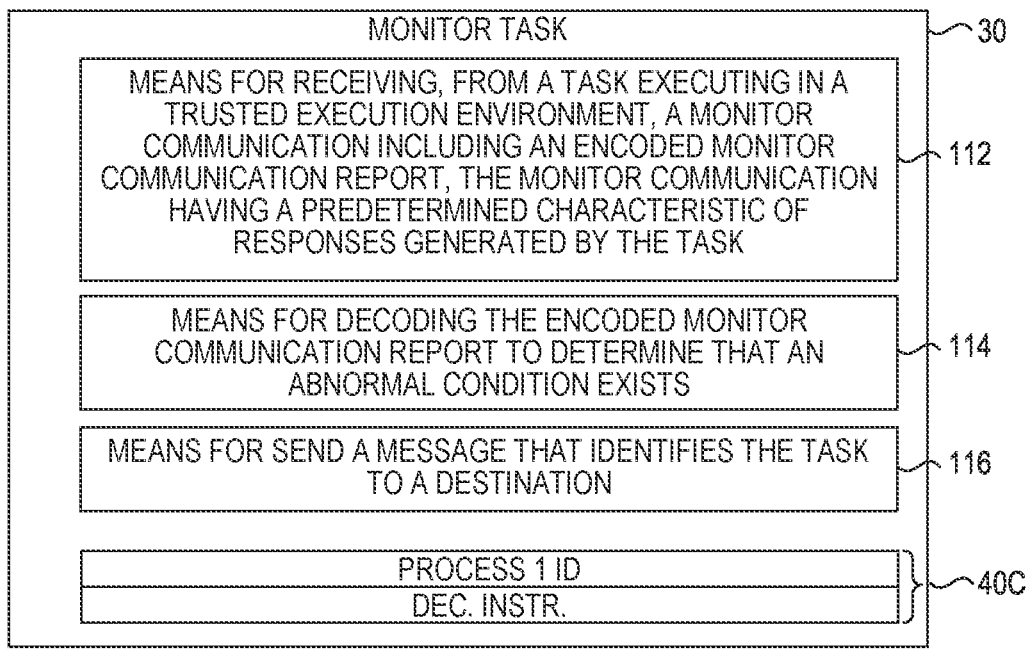
FIG. 11 is a block diagram of a monitor task suitable for monitoring a task that executes in a TEE according to additional implementations.

FIG. 11 is a block diagram of the monitor task 30 according to additional implementations. In this implementation, the monitor task 30 includes a means 112 for receiving, from a task executing in a TEE, a monitor communication including an encoded monitor communication report, wherein the monitor communication has a predetermined characteristic of responses generated by the task. The means 106 may be implemented in any number of manners, including, for example, via the monitor communication receiver 106 illustrated in FIG. 10. The means 112 may implement logic to receive, via an inter-process communication mechanism such as a physical or virtual network adapter, a monitor communication addressed to the monitor task 30 by the task.

The monitor task 30 also includes a means 114 for decoding the encoded monitor communication report to determine that an abnormal condition exists. The means 114 may be implemented in any number of manners, including, for example, via the monitor communication report decoder 108 illustrated in FIG. 10. The means 114 may implement logic that accesses decoding instructions, and based on the decoding instructions decodes the encoded monitor communication report.

The monitor task 30 also includes a means 116 for sending a message that identifies the task to a destination. The means 116 may be implemented in any number of manners, including, for example, via the message sender 110 illustrated in FIG. 10. The means 116 may implement logic that addresses a message to the management system 22, and transmits the message via an inter-process communication mechanism, such as via a physical or virtual network transceiver, or the like.

Figure 12:
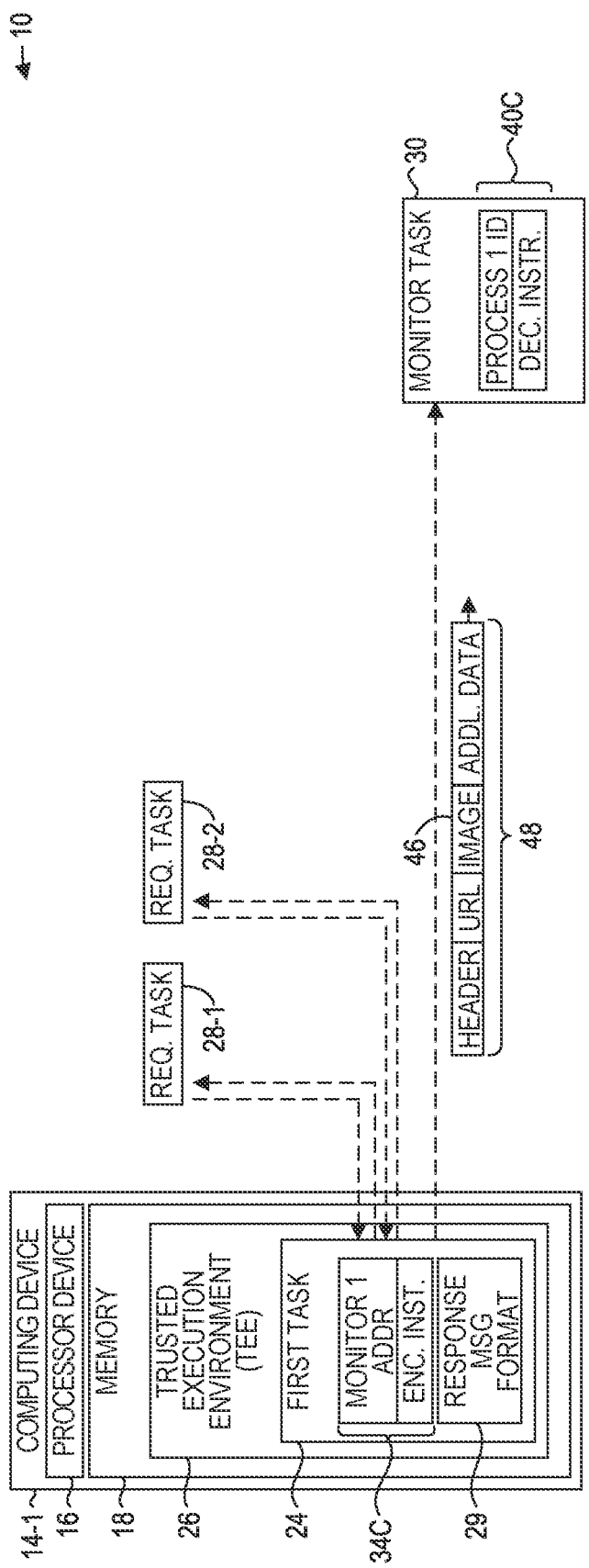
FIG. 12 is a simplified block diagram of the environment illustrated in FIG. 1 according to one example.

FIG. 12 is a simplified block diagram of the environment illustrated in FIG. 1 according to one example. The environment 10 includes the computing device 14-1 that includes the memory 18, the processor device 16, and the TEE 26. The processor device 16 is coupled to the memory 18 and the TEE 26 to determine, via the first task 24 executing in the TEE 26, that a monitor communication is to be sent to the monitor task 30, the first task 24 being configured to generate response messages in response to requests from requestor tasks 28, the response messages having a predetermined characteristic. The processor device 16 is further to, via the first task 24, generate the monitor communication 48, the monitor communication 48 having the predetermined characteristic and an encoded monitor communication report 46. The processor device 16 is further to, via the first task 24, send the monitor communication 48 toward the monitor task 30.

Figure 13:
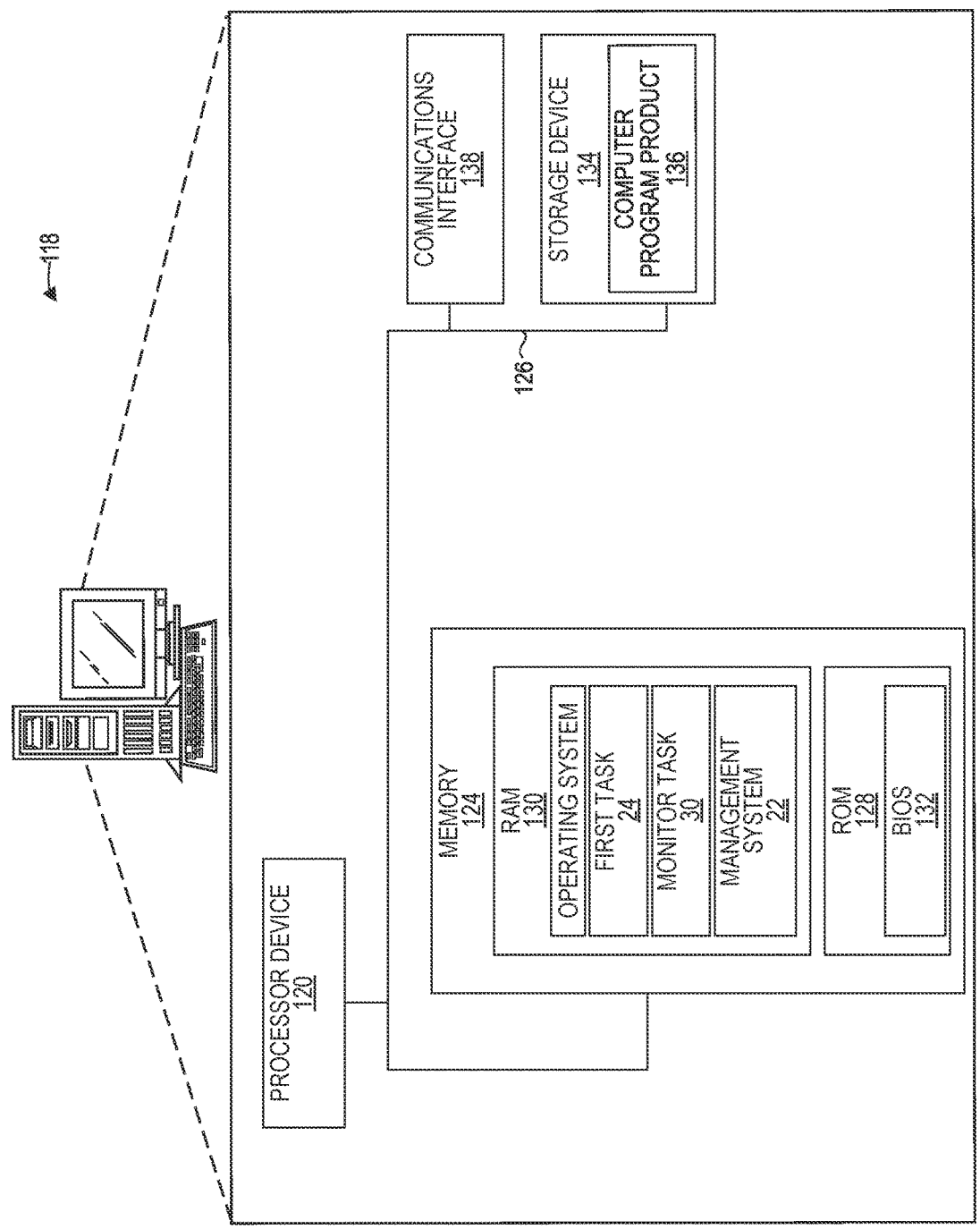
FIG. 13 is a block diagram of a computing device suitable for implementing any of the computing devices disclosed herein.

FIG. 13 is a block diagram of a computing device 118 suitable for implementing any of the computing devices disclosed herein. The computing device 118 may comprise any computing or electronic device capable of including firmware, hardware, and/or executing software instructions to implement the functionality described herein, such as a computer server, a desktop computing device, a laptop computing device, or the like. The computing device 118 includes a processor device 120 capable of implementing a TEE, a memory 124, and a system bus 126. The system bus 126 provides an interface for system components including, but not limited to, the memory 124 and the processor device 120. The processor device 120 can be any commercially available or proprietary processor.

The system bus 126 may be any of several types of bus structures that may further interconnect to a memory bus (with or without a memory controller), a peripheral bus, and/or a local bus using any of a variety of commercially available bus architectures. The memory 124 may include non-volatile memory 128 (e.g., read-only memory (ROM), erasable programmable read-only memory (EPROM), electrically erasable programmable read-only memory (EEPROM), etc.), and volatile memory 130 (e.g., random-access memory (RAM)). A basic input/output system (BIOS) 132 may be stored in the non-volatile memory 128 and can include the basic routines that help to transfer information between elements within the computing device 118. The volatile memory 130 may also include a high-speed RAM, such as static RAM, for caching data.

The computing device 118 may further include or be coupled to a non-transitory computer-readable storage medium such as a storage device 134, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 134 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 134 and in the volatile memory 130, including an operating system and one or more program modules, such as the first task 24, the monitor task 30 and/or the management system 22, which may implement the functionality described herein in whole or in part.

All or a portion of the examples may be implemented as a computer program product 136 stored on a transitory or non-transitory computer-usable or computer-readable storage medium, such as the storage device 134, which includes complex programming instructions, such as complex computer-readable program code, to cause the processor device 120 to carry out the steps described herein. Thus, the computer-readable program code can comprise software instructions for implementing the functionality of the first task 24, the monitor task 30 and/or the management system 22 described herein when executed on the processor device 120.

The computing device 118 may also include a communications interface 138, such as an Ethernet transceiver or the like, suitable for communicating with a network as appropriate or desired.

Other computer system designs and configurations may also be suitable to implement the systems and methods described herein. The following examples illustrate various implementations in accordance with one or more aspects of the disclosure.

Example 1 is a method comprising: receiving, by a computing device comprising a processor device, from a task executing in a trusted execution environment, a monitor communication including an encoded monitor communication report, the monitor communication having a predetermined characteristic of responses generated by the task; decoding the encoded monitor communication report to determine that an abnormal condition exists; and sending a message that identifies the task to a destination.

Example 2 is the method of example 1 wherein decoding the encoded monitor communication report to determine that the abnormal condition exists comprises accessing decoding instructions that indicate how to decode the encoded monitor communication report.

Example 3 is the method of example 2 further comprising receiving the decoding instructions from a management system.

Example 4 is a computing device comprising a memory and a processor device coupled to the memory. The processor device is to receive, from a task executing in a trusted execution environment, a monitor communication including an encoded monitor communication report, the monitor communication having a predetermined characteristic of responses generated by the task; decode the encoded monitor communication report to determine that an abnormal condition exists; and send a message that identifies the task to a destination.

Example 5 is the computing device of example 4 wherein to decode the encoded monitor communication report to determine that the abnormal condition exists, the processor device is further to access decoding instructions that indicate how to decode the encoded monitor communication report.

Example 6 is the computing device of example 5 wherein the processor device is further to receive the decoding instructions from a management system.

Example 7 is a method comprising initiating, by a computing device comprising a processor device, a first task in a first trusted execution environment (TEE); and communicating to the first task an address of a monitor task and encoding instructions for generating an encoded monitor communication report for sending to the monitor task.

Example 8 is the method of example 7 further comprising initiating the monitor task in a second TEE; and communicating to the monitor task an identifier of the first task and decoding instructions for decoding an encoded monitor communication report received from the first task.

Example 9 is the method of example 8 further comprising receiving, from the monitor task, information that identifies the first task and that indicates the task has an abnormal condition; and in response to receiving the information, terminating the first task.

Example 10 is a computing device comprising a memory and a processor device coupled to the memory. The processor device is to initiate a first task in a first trusted execution environment (TEE); and communicate to the first task an address of a monitor task and encoding instructions for generating an encoded monitor communication report for sending to the monitor task.

Example 11 is the computing device of example 10 wherein the processor device is further to initiate the monitor task in a second TEE; and communicate to the monitor task an identifier of the first task and decoding instructions for decoding an encoded monitor communication report received from the first task.

Example 12 is the computing device of example 11 wherein the processor device is further to receive, from the monitor task, information that identifies the first task and that indicates the first task has an abnormal condition; and in response to receiving the information, terminate the task.

Example 13 is a system comprising a first computing device comprising: a first memory; a trusted execution environment (TEE); and a first processor device coupled to the first memory and the TEE to: determine, by a first task executing in the TEE, that a monitor communication is to be sent to a monitor task, the first task being configured to generate response messages in response to requests from requestor tasks, the response messages having a predetermined characteristic; generate the monitor communication, the monitor communication having the predetermined characteristic, and an encoded monitor communication report; and send the monitor communication toward the monitor task.

Example 14 is the system of example 13 further comprising a second computing device comprising a memory and a processor device coupled to the memory. The processor device is to receive, from the first task executing in a trusted execution environment, the monitor communication including an encoded monitor communication report, the monitor communication having a predetermined characteristic of responses generated by the first task; decode the encoded monitor communication report to determine that an abnormal condition exists; and send a message that identifies the first task to a destination.

Example 15 is the system of example 14 further comprising a third computing device comprising a memory and a processor device coupled to the memory. The processor device is to initiate the first task in the TEE; and communicate to the first task an address of the monitor task and encoding instructions for generating the encoded monitor communication report for sending toward the monitor task.

Example 16 is the system of example 15 wherein the second computing device is to receive information that identifies a plurality of tasks, including the first task, each task executing in a corresponding TEE; and receive corresponding decoding instructions for each respective task that indicate how to decode messages from the respective task, each decoding instruction being different.

Example 17 is the system of example 16 wherein the second computing device is to receive respective monitor communications that include encoded monitor communication reports from each of the plurality of respective tasks; decode respective encoded monitor communication reports in accordance with corresponding decoding instructions; and for each encoded monitor communication report that indicates an abnormal condition exists, send a message identifying a task that generated the encoded monitor communication report to a respective destination.

Example 18 is a first task comprising means for determining that a monitor communication is to be sent to a monitor task; means for generating the monitor communication, the monitor communication having a predetermined characteristic of response messages that are generated in response to requests from requestor tasks, and having an encoded monitor communication report; and means for sending the monitor communication toward the monitor task.

Example 19 is a monitor task comprising means for receiving, from a task executing in a TEE, a monitor communication including an encoded monitor communication report, wherein the monitor communication has a predetermined characteristic of responses generated by the task; means for decoding the encoded monitor communication report to determine that an abnormal condition exists; and means for sending the monitor communication toward the monitor task.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a monitor task executing in a first trusted execution environment (TEE) implemented on a processor device from a first task executing in a second TEE, a first monitor communication including a first encoded monitor communication report, the first monitor communication having a first predetermined characteristic of a plurality of predetermined characteristics of responses generated by the first task, wherein each of the plurality of predetermined characteristics complies with an expected message format of responses generated by the first task, and wherein the plurality of predetermined characteristics comprises content descriptive of a first topic stored to a first field of the first monitor communication;

decoding the first encoded monitor communication report to generate a first decoded monitor communication report based on decoding instructions, wherein the decoding instructions comprise information that describes, for each of the plurality of predetermined characteristics, whether the predetermined characteristic is indicative of an abnormal condition or a normal condition, wherein decoding the first encoded monitor communication report comprises:
accessing the decoding instructions, wherein the decoding instructions describe the first topic as being indicative of the abnormal condition;
determining, based on the first decoded monitor communication report, that the abnormal condition exists; and
taking an action in response to determining that the abnormal condition exists, wherein taking the action comprises:
causing the first task to be terminated.

2. The method of claim 1 wherein the action further comprises sending an alert to a destination that identifies the first task.

3. The method of claim 1 wherein the first TEE and the second TEE are both implemented on a same computing device.

4. The method of claim 1 further comprising receiving, by the monitor task, a task identifier that identifies the first task.

5. The method of claim 1, wherein decoding the first encoded monitor communication report to generate the first decoded monitor communication report based on the decoding instructions comprises receiving, by the monitor task, the decoding instructions.

6. The method of claim 1 further comprising:
receiving, by the monitor task from a second task executing in the second TEE, a second monitor communication including a second encoded monitor communication report, the second monitor communication having a second predetermined characteristic of responses generated by the second task;
decoding the second encoded monitor communication report based on the decoding instructions to generate a second decoded monitor communication report; and
determining, based on the second decoded monitor communication report, that no abnormal condition exists.

7. The method of claim 1 wherein the first task executes in the second TEE on a second computing device and the monitor task executes in the first TEE on a third computing device.

8. The method of claim 1, wherein causing the first task to be terminated comprises:
sending, to the second TEE, instructions to terminate the first task executing in the second TEE.

9. A computing device comprising:
a first memory;
a first trusted execution environment (TEE); and
a first processor device coupled to the first memory and the first TEE to:
receive, by a monitor task executing in the first TEE from a first task executing in a second TEE, a first monitor communication including a first encoded monitor communication report, the first monitor communication having a first predetermined characteristic of a plurality of predetermined characteristics of responses generated by the first task, wherein each of the plurality of predetermined characteristics complies with an expected message format of responses generated by the first task, and wherein the plurality of predetermined characteristics comprises content descriptive of a first topic stored to a first field of the first monitor communication;

decode, by the monitor task, the first encoded monitor communication report to generate a first decoded monitor communication report based on decoding instructions, wherein the decoding instructions comprise information that describes, for each of the plurality of predetermined characteristics, whether the predetermined characteristic is indicative of an abnormal condition or a normal condition, wherein, to decode the first encoded monitor communication report, the first processor device is to:
- access the decoding instructions, wherein the decoding instructions describe the first topic as being indicative of the abnormal condition;

determine, by the monitor task, based on the first decoded monitor communication report, that the abnormal condition exists; and take, by the monitor task, an action in response to determining that the abnormal condition exists, wherein to take the action, the first processor device is to:
- cause, by the monitor task, the first task to be terminated.

10. The computing device of claim 9 wherein, to decode the first encoded monitor communication report to generate the first decoded monitor communication report based on the decoding instructions, the first processor device is to receive, by the monitor task, the decoding instructions.

11. The computing device of claim 9 wherein the predetermined characteristic comprises an image field configured to store image data, and wherein the encoded monitor communication report comprises an encoded image.

12. A non-transitory computer-readable storage medium that includes instructions to cause a processor device to:
receive, by a monitor task executing in a first trusted execution environment (TEE) implemented on the processor device from a first task executing in a second TEE, a first monitor communication including a first encoded monitor communication report, the first monitor communication having a first predetermined characteristic of a plurality of predetermined characteristics of responses generated by the first task, and wherein each of the plurality of predetermined characteristics complies with an expected message format of responses generated by the first task, and wherein the plurality of predetermined characteristics comprises content descriptive of a first topic stored to a first field of the first monitor communication;

decode the first encoded monitor communication report to generate a first decoded monitor communication report based on decoding instructions, wherein the decoding instructions comprise information that describes, for each of the plurality of predetermined characteristics, whether the predetermined characteristic is indicative of an abnormal condition or a normal condition, wherein, to decode the first encoded monitor communication report, the processor device is to:
- access the decoding instructions, wherein the decoding instructions describe the first topic as being indicative of the abnormal condition;

determine, based on the first decoded monitor communication report, that the abnormal condition exists; and take an action in response to determining that the abnormal condition exists, wherein to take the action, the instructions further cause the processor device to:
- cause, via the monitor task, the first task to be terminated.

13. The non-transitory computer-readable storage medium of claim 12 wherein, to decode the first encoded monitor communication report to generate the first decoded monitor communication report based on the decoding instructions, the instructions cause the processor device to receive, by the monitor task, the decoding instructions.

14. The non-transitory computer-readable storage medium of claim 12 wherein the predetermined characteristic comprises an image field configured to store image data, and wherein the encoded monitor communication report comprises an encoded image.

* * * * *